United States Patent [19]
Tsukamoto et al.

[11] 3,957,219
[45] May 18, 1976

[54] ENDLESS TAPE TRAVELING DEVICE

[75] Inventors: Hiroyuki Tsukamoto, Kawasaki; Morio Akino, Fujisawa; Yoshihiro Kusanagi, Yokohama, all of Japan

[73] Assignee: Tokyo Shibaura Electric Co., Ltd., Kawasaki, Japan

[22] Filed: Oct. 9, 1974

[21] Appl. No.: 513,234

[30] Foreign Application Priority Data
Oct. 18, 1973  Japan............................ 48-117299

[52] U.S. Cl........................................ 242/55.19 A
[51] Int. Cl.²...................................... B65H 17/48
[58] Field of Search............. 242/55.19 A, 55.19 R; 352/128

[56] References Cited
UNITED STATES PATENTS

| | | |
|---|---|---|
| 2,065,954 | 12/1936 | Mihaly.......................... 242/55.19 R |
| 2,203,032 | 6/1940 | Spence, Jr................ 242/55.19 R X |
| 3,590,221 | 6/1971 | Malkowski............... 242/55.19 A X |
| 3,773,271 | 11/1973 | Brannan...................... 242/55.19 A |
| 3,787,057 | 1/1974 | Cailliot.................... 242/55.19 A X |

*Primary Examiner*—Edward J. McCarthy
*Attorney, Agent, or Firm*—Oblon, Fisher, Spivak, McClelland & Maier

[57] ABSTRACT

An endless tape traveling device includes a substrate and a tape roll loaded stationary reel secured to the substrate. An endless tape is delivered from the innermost periphery of tape roll, through a slit provided across the width of the reel, toward the interior of the reel and, after running at high speed through a tape traveling path, wound around the the outer periphery of the tape roll.

9 Claims, 6 Drawing Figures

ENDLESS TAPE TRAVELING DEVICE

This invention relates to an endless tape traveling device, and particularly to an endless tape traveling device suitable to run an endless tape at high speed.

A video tape recorder (VTR) is generally used as a device for recording and reproducing video signals such as TV signals. The conventional video tape recorder adapted to record and reproduce video signals through a rotary type magnetic head requires a servo mechanism for tracking and, furthermore, a rotary head mechanism and a tape traveling mechanism are complicated in construction. This provides a bar to the simplification and miniaturization of the video tape recorder, resulting in an extremely high cost.

To obviate the above-mentioned drawbacks, there has been considered a device for recording and reproducing video signals using an endless tape and a stationary magnetic head. In this device, the tape is required to be stably traveled at a high speed of more than 3 m per second. A reel is rotatably mounted on a substrate and has an annular body around the outer periphery of which a V-shaped groove is provided. The V-shaped groove permits the tape to be delivered obliquely from the innermost periphery of a tape roll which is loaded on the annular body of the reel. If such rotatable reel is used, a bearing mechanism such as a ball bearing is required since the reel is rotated at high speed. This makes complicated the arrangement of associated parts to be located in the neighborhood of the reel and provides a bar to the simplification and miniaturization of a cassette device. Furthermore, it is impossible to rotate the reel at constant speed. As a result, jitters occur on a reproduced image due to the non-uniform rotation of the reel. Where the tape is obliquely delivered from the innermost periphery of the tape roll, an unauthorized or undesirable force tends to be applied to the tape, causing the tape to be injured or worn out. As a result, the service life of the tape is shortened.

The object of this invention is to provide an endless tape traveling device which is simple in construction as well as is capable of stably delivering an endless tape from the innermost periphery of a tape roll wound around a reel, without imparting any unauthorized or undesirable force to the tape, and takes up the traveled tape around the outermost periphery of the tape roll.

According to one embodiment of this invention the endless tape traveling device comprises a substrate; a stationary reel mounted on the substrate and having an annular body around which an endless tape roll is wound, and communicating means formed in the annular body to communicate the outer peripheral surface of the annular body to the inner peripheral surface thereof; a guide member mounted on the sustrate within the interior of the annular body; and driving means to travel the endless tape so that the endless tape wound around the annular body is delivered from the innermost periphery through the communicating means to the guide member and taken up around the outer periphery of the tape roll.

This invention will be further explained by reference to the accompanying drawings in which.

Figure 1:
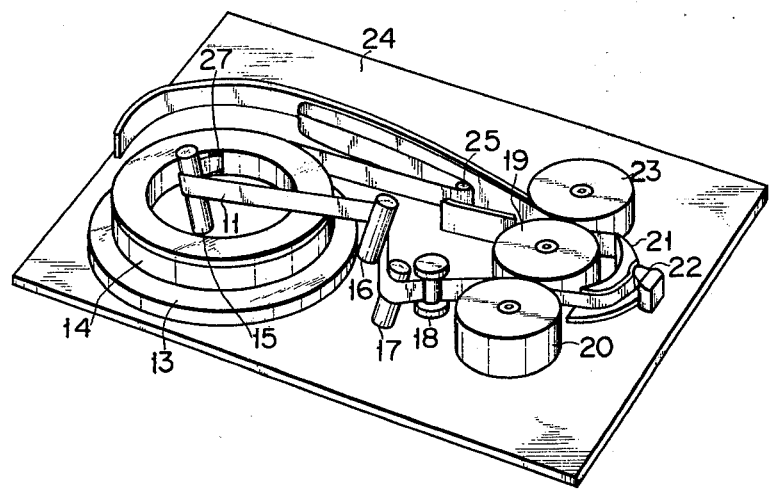
FIG. 1 is a perspective view showing a tape traveling device according to one embodiment of this invention.
Figure 2:
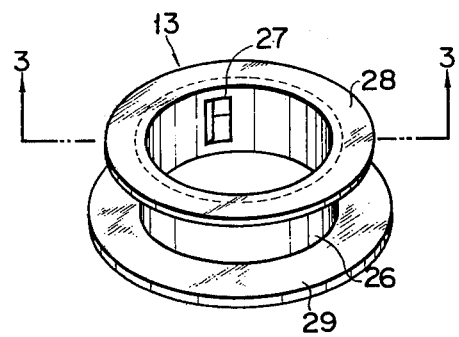
FIG. 2 is a perspective view showing a stationary reel of the tape traveling device of FIG. 1.
Figure 3:
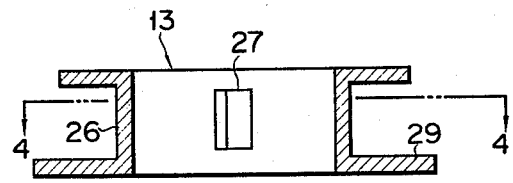
FIG. 3 is a cross sectional view, taken along line 3—3 of FIG. 2, of the stationary reel of FIG. 2.

One embodiment of this invention will be explained by reference to the accompanying drawings.

A stationary reel 13 is immovably secured by a suitable means to a substrate 12. The reel 13 includes an annular body 26 having a height somewhat greater than the width of a tape 11 so as to permit the latter to be wound around the outer periphery of the annular body, a upper flange 28 provided on the upper end of the annular body 26 and a lower flange 29 provided on the lower end of the annular body 26. The upper flange 28 is smaller in diameter than the lower flange 29, which has such a diameter that the tape roll 14 wound around the annular body does not extend beyond the upper flange 28. Consequently, the tape roll is restricted in its upward and downward movement by the upper and lower flanges. The annular body may be formed integral with the upper and lower flanges using stainless steel or synthetic resin. Where the stationary reel is made of the synthetic resin, the surface of the reel is preferably coated with graphite so as to obtain a small frictional coefficient.

Figure 4:
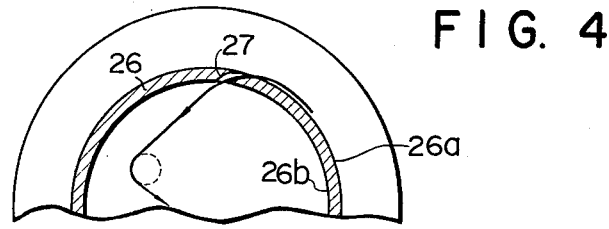
FIG. 4 is a cross sectional view taken along line 4—4 of FIG. 3, of the stationary reel of FIG. 2.
Figure 5:
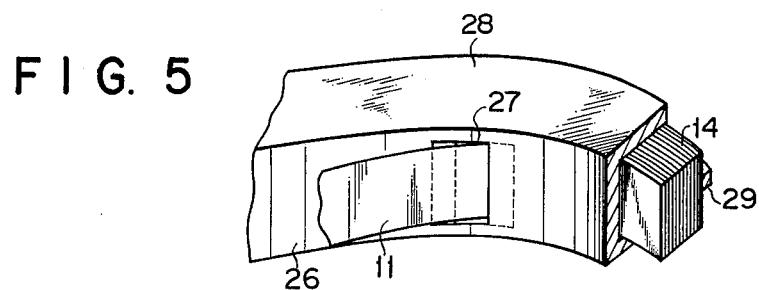
FIG. 5 is a fragmentary, perspective view of the stationary reel of FIG. 2 from which a tape is taken out.

A communicating means 27 such as a slit, notch or opening is provided across the width of the annular wall of the body 26. As shown in FIG. 4, the slit 27 preferably extends curvilinearly from the outer surface 26a of the annular body and opens at the inner surface 26b thereof to define a predetermined curvature. The innermost periphery of the tape roll is guided through the slit 27 toward the interior of the annular body as shown in FIG. 4. The curvature of the inner surface of the slit 27 is so determined that during the running of the tape any unequal or undesirable force is not applied to the tape.

In FIG. 1 the tape from the innermost periphery of the tape roll 14 wound around the annular body 26 is delivered through the slit 27 to a guide pole 15 mounted in an inclined manner on the substrate 12 and within the annular body and is passed clear of the tape roll. Then, the tape is guided through two guide poles 16, 17 also mounted in an inclined manner on the substrate 12 so that it runs parallel to the surface of the substrate 12. The tape is further conducted through a guide pole 18 and subsequently between a capstan 19 and an inlet pinch roll 20. The guide pole 18 is flanged at its upper and lower ends so as to restrict the vibration of the tape between the upper and lower flanges. The capstan 19 is rotated at a constant speed by a motor, not shown, mounted below the substrate 12, to cause the tape 11 to travel at high constant speed.

The tape is further conducted from between the capstan 19 and the pinch roll 20 toward a guide 21 where it is scanned by a magnetic head 22 opppositely confronting the guide 21. By scanning the magnetic tape 11 by virtue of the magnetic head 22, video signals are recorded onto, and reproduced from, the magnetic tape. The scannned tape 11 is then guided through a nip between the capstan 19 and an outlet pinch roll 23 to a tape reservoir 24 where slack is imparted to the tape. After traveling from the tape reservoir 24 to a guide pole 25, the tape is wound around the outermost periphery of the tape roll.

With the tape traveling device so constructed, if the tape travels at a high speed, preferably at a speed of more than 3 m/sec, and more preferably at a speed of more than 5 m/sec, the tape from the innermost periphery of the tape roll is delivered through the slit 27 to the guide pole 15 and guided toward the guide 21 where it is scanned by the magnetic head 22. Then, the tape is wound around the outer periphery of the tape roll. Since the tape travels at high speed, an air film is defined between the innermost periphery of the tape roll and the outer peripheral surface of the annular body, thus assuring a smooth rotation of the tape roll against the stationary reel 13.

Since, during the running of the tape, the lower edge of the tape roll is contacted with the upper surface of the lower flange 29 of the stationary reel 13, the tendency of the tape to be expanded outward under a centrifugal force is somewhat prevented. This is more effectively done by modifying the stationary reel as shown in FIG. 6.

Figure 6:
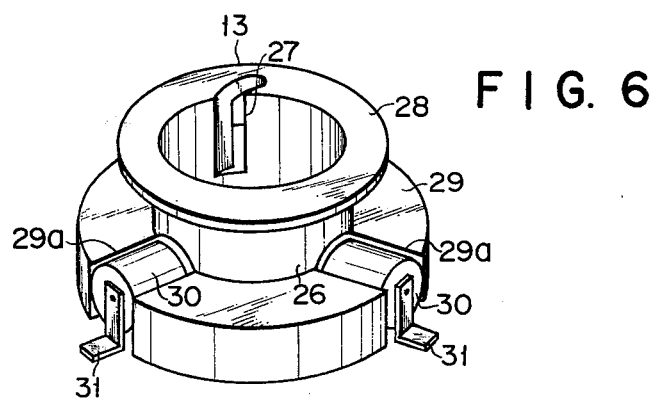
FIG. 6 is a perspective view showing a modified stationary reel.

In FIG. 6, three cutouts 29a are provided at predetermined intervals in a lower flange 29 of the stationary reel 13 and extend radially of the lower flange 29. Into the cutout 29a a rubber roll 30 is so mounted that the outer peripheral portion thereof partially extends beyond the upper surface of the lower flange 29. The rubber roll 30 is supported by a supporting member 31 secured to the substrate, and is rotatable about an axis corresponding to a line extending radially of the stationary reel 13. As a result, the lower edge of the tape roll wound around the annular body 26 of the reel 13 is contacted with the outer periphery of the rubber roll 30 and is prevented from being contacted with the upper surface of the lower flange. When the tape travels at high speed, the tape roll is correspondingly rotated at high speed whereby the rubber roll is also rotated. In this case, the rotation of the tape roll is not almost prevented due to the presence of the rubber roll, but the excess outward expansion of the tape roll is restricted by the rubber roll.

Though three rubber rolls are used in the above-mentioned embodiment, the number of rubber rolls can be suitably selected as long as the rotation of the tape roll is not prevented. The lower flange of the stationary reel may be omitted. In this case, the annular body is mounted directly to the substrate and the rubber roll is fitted into the associated hole formed in the substrate, or so mounted below the substrate that the outer periphery of the rubber roll partially extends beyond the surface of the substrate. The substrate may constitute the bottom plate of a cassette. In this case, the stationary reel is mounted on the bottom surface of the cassette. The guide pole 15 may be replaced, for example, by a guide plate, or a conical body, which has an inclined surface for guiding a tape. The guide pole 15 may be mounted vertical to the surface of the substrate.

The endless tape traveling device according to this invention permits the endless tape to travel at high speed. Since the tape is delivered through the slit 27 from the innermost periphery of the tape roll, the stationary reel can be used. As a result, various drawbacks as encountered in the rotatable reel can be eliminated according to this invention.

What we claim is:

1. An endless tape traveling device comprising:
   a substrate;
   a stationary reel mounted on the substrate and having an annular body around which an endless tape roll is wound, and communicating means formed in the annular body to communicate the outer peripheral surface of the annular body to the inner peripheral surface thereof;
   a guide member mounted on the substrate within the interior of the annular body; and
   driving means for driving the endless tape such that an air film is formed between the innermost periphery of the tape roll and said outer peripheral surface of said annular body and the endless tape wound around the annular body is delivered from the innermost periphery of the tape roll, through the communicating means to the guide member, and taken up around the outer periphery of the tape roll.

2. An endless tape traveling device according to claim 1, in which said tape driving means includes a member to cause the endless tape to travel at a high speed of more than 3 m/sec.

3. An endless tape traveling device according to claim 1, in which said tape driving means has a capstan and a pinch roll between which the endless tape is sandwiched for driving.

4. An endless tape traveling device according to claim 1, in which said guide member includes a pole mounted on the substrate in an inclined manner.

5. An endless tape traveling device according to claim 3, further including means for guiding the endless tape from said guide member to between said capstan and said pinch roll and guiding the endless tape from between said capstan and said pinch roll toward the outermost periphery of the tape roll.

6. An endless tape traveling device according to claim 1, in which said communicating means has an opening provided across the width of said annular body, said opening curvilinearly extending from the outer periphery of the annular body and being open at the inner periphery of the annular body in a manner that a predetermined curvature is defined.

7. An endless tape traveling device according to claim 1, in which said communicating means has a slit provided across the width of said annular body, said slit curvilinearly extending from the outer periphery of the annular body and being open at the inner periphery of the annular body in a manner that a predetermined curvature is defined.

8. A tape traveling device comprising:
   a substrate;
   a stationary annular body mounted on the substrate and having an endless tape roll wound thereon and a communicating means for delivering the endless tape from the innermost periphery of the tape roll toward the interior of the annular body;
   rubber rolls arranged around the outer periphery of the annular body for contacting the lower side surface of the tape roll;
   a guide member mounted upon the substrate and within the inner periphery of the annular body for guiding the delivered endless tape toward the outside of the annular body;
   a tape traveling means adapted to guide the endless tape from the guide means toward the annular body to permit the endless tape to be wound around the outer periphery of the tape roll; and
   a tape driving means mounted within the tape traveling means for driving the endless tape such that an air film is formed between the innermost periphery of the tape roll and the outer peripheral surface of said annular body.

9. An endless tape traveling device as set forth in claim 4, wherein said guide member is stationary upon said substrate.

* * * * *